United States Patent [19]

Ricca

[11] 4,035,016
[45] July 12, 1977

[54] DOOR HOLDING ASSEMBLY
[75] Inventor: John S. Ricca, Bartonville, Ill.
[73] Assignee: Caterpillar Tractor Co., Peoria, Ill.
[21] Appl. No.: 678,847
[22] Filed: Apr. 21, 1976
[51] Int. Cl.² ............... B62D 23/00; E05C 5/02
[52] U.S. Cl. .............................. 296/28 C; 292/113
[58] Field of Search ............ 292/11, 66, 113, 66; 296/28 C

[56] References Cited
U.S. PATENT DOCUMENTS 3,847,423  11/1974  Gley ............................. 292/113
3,940,177  2/1976   Miers ........................... 296/28 C

FOREIGN PATENT DOCUMENTS 324,267  12/1902  France ............................. 292/66

Primary Examiner—Philip Goodman
Attorney, Agent, or Firm—Wegner, Stellman, McCord, Wiles & Wood

[57] ABSTRACT

In a sheet metal cab structure for a vehicle provided with a rollover protection structure including a vertical post and a door hingedly mounted for movement between open and closed positions about a vertical axis closely adjacent the post, a door holding assembly including a base mounted on the door and including a stop at one end thereof positioned to engage the sheet metal cab at a location whereat the sheet metal is backed by the vertical post when the door is in an open position, a crank having a handle and an eccentric is journalled in the base and a resilient link is connected to the eccentric. Selectively operable securing devices including one end of the link remote from the eccentric and a bracket secured to the cab wall are provided so that the link may be selectively connected or disconnected from the sheet metal cab. A rotation limiting device is provided for limiting rotation of the crank relative to the base so that a resilient, over center action is provided allowing the resilience of the link to cause the stop to firmly abut the sheet metal cab at the location where it engages the same.

7 Claims, 3 Drawing Figures

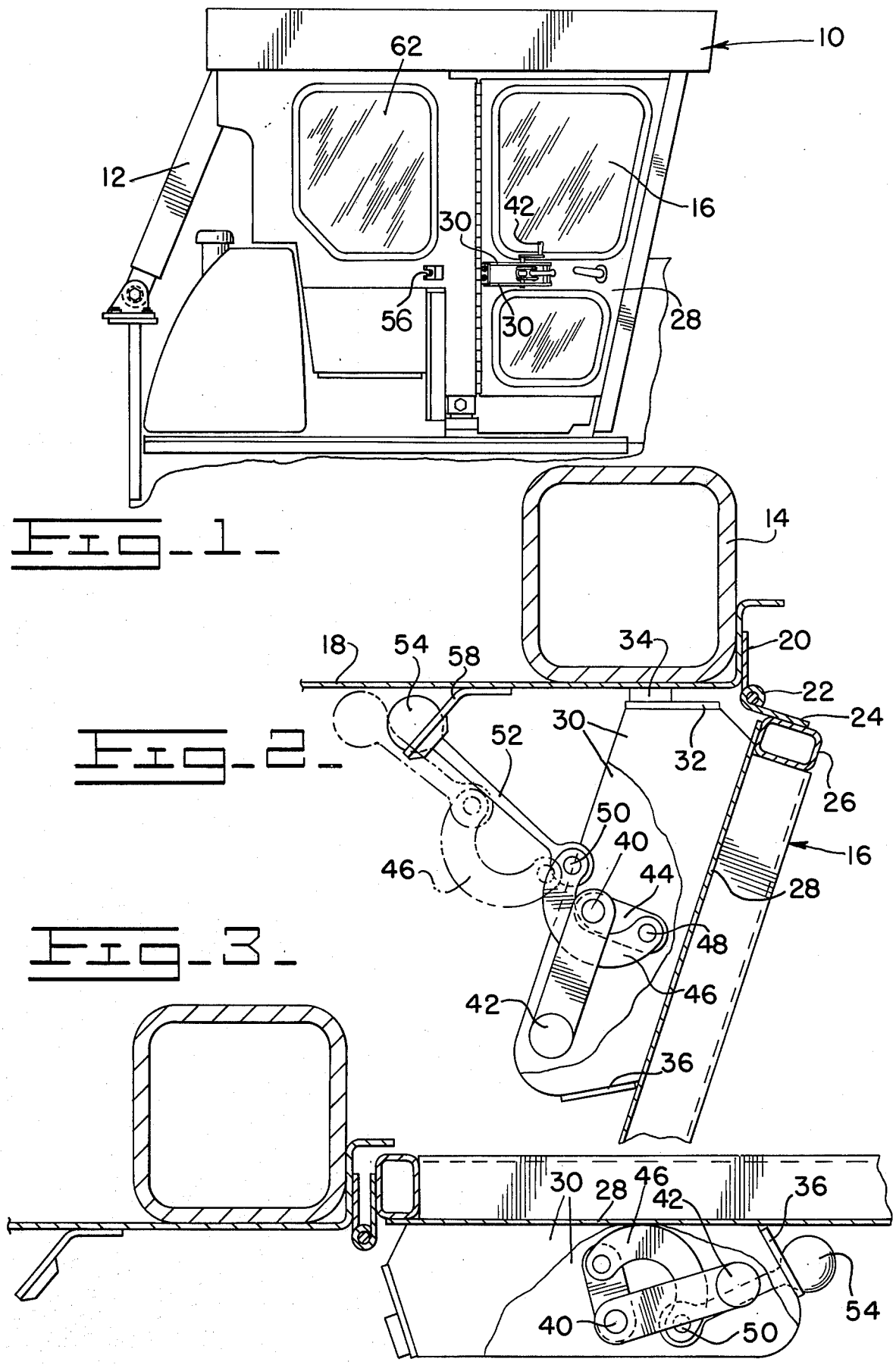

DOOR HOLDING ASSEMBLY

BACKGROUND OF THE INVENTION

This invention relates to door holding assemblies, and more particularly, to door holding assemblies particularly suited for use in connection with doors employed in sheet metal cabs for vehicles or the like.

The use of completely enclosed sheet metal cabs on vehicles as, for example, earth movers, tractors, etc., is becoming increasingly common. Frequently, such cabs are airconditioned and therefore may be closed at all times during operation. However, many times when outside temperatures are not severe, an operator may prefer to turn off the air-conditioning and ventilate the cab by opening a door, a window, or both.

It has been a quite common occurrence, when operating a cab with the door open, to employ a rope or a cable or the like to hold the door against a stop so that the same will not close during movement of the vehicle. Frequently, however, when the cable is tied to the door and/or some other part of the vehicle structure to anchor the same, a certain amount of slack may be present with the result that the door may slam against its stop, ultimately causing the stop to give way. Frequently, too, the stop will be inadvertently bent during the tying process by the application of too much force to the cable or rope.

As a consequence, the door may be permitted to move past its intended maximum open position to strike other parts of the cab, frequently a window or the like, with resulting breakage of the same.

Not only is the replacement cost of broken windows or parts an unnecessary expense to the owner of the vehicle, but where windows are broken, the same makes it impossible to achieve satisfactory operating conditions when weather conditions are more severe through the use of air-conditioning or the like.

SUMMARY OF THE INVENTION

It is the principal object of the invention to provide a new and improved sheet metal cab and door structure for use in vehicles. More specifically, it is an object of the invention to provide a door holding structure which positively holds a door against the stop without applying damaging force to the stop which could ultimately lead to the destruction of the stop and damage to the door and/or cab components.

An exemplary embodiment of the invention achieves the foregoing objects in a device for selectively holding a door against a stop including a crank having a handle and an eccentric. Means are provided for mounting the crank for rotation and are adapted to be secured to either the door or the wall of the cab mounting the door. A resilient linkage has one end connected to the eccentric. Securing means, including two elements that are selectively interconnectible with each other, are provided with one of the elements being on the link and the other being adapted to be secured to the other of the door and the wall of the cab. Means are provided for limiting rotation of the crank on the mounting means to allow an over center action in the linkage whereby the resilience of the linkage will firmly hold the door against the stop.

In a preferred embodiment, the motion limiting means comprises a nonlinear link connecting the linkage to the eccentric and adapted to engage the crank at one position of movement to limit further rotation thereof.

Preferably, the door holding assembly is employed in a sheet metal cab structure for a vehicle provided with a rollover protection structure including a vertical post and a door hingedly mounted for movement between open and closed positions about a vertical axis closely adjacent the post. The holdback assembly includes a base mounted on the door with a stop at one end thereof positioned to engage the cab wall at a location whereat the same is backed by the vertical post. Typically, there will be two nonlinear links and each will be curved and spaced about the eccentric and the resilient link.

In a highly preferred embodiment, the resilient link is formed of an elastomer and the end forming part of a removable securable connection comprises a bulbous formation adapted to be received in a slotted member.

In a highly preferred embodiment, the base includes a structure for receiving the resilient link and the nonlinear rigid link is further arranged to limit movement of the crank when the securing end of the link is disposed in the receiving means so that the link and the crank will be stowed, under tension, and will not rattle when not employed to hold a door open.

Other objects and advantages will become apparent from the following specification taken in connection with the accompanying drawings.

DESCRIPTION OF THE DRAWINGS

FIG. 1 is a fragmentary side elevation of a cab for a vehicle embodying a door holding assembly made according to the invention;

FIG. 2 is an enlarged, fragmentary, horizontal section of the door holding assembly in its operative configuration; and FIG. 3 is a view similar to FIG. 2 but illustrating the door holding assembly in its inoperative, or stowed, configuration.

DESCRIPTION OF THE PREFERRED EMBODIMENT

An exemplary embodiment of a door holding mechanism made according to the invention is illustrated in the drawings in connection with a sheet metal cab, generally designated 10, for a vehicle such as a tractor or the like. The vehicle typically will be provided with a rollover protection structure including horizontal cross members (not shown) supported by one or more vertical posts 12. The rollover protection structure will also include interior vertical posts 14 (FIG. 2) adjacent a door 16 whereby entry to the interior of the cab 10 may be obtained.

As can be seen in the various Figures, a sheet metal panel 18 forming part of the cab 10 abuts up against the vertical post 14 and one leaf 20 of a hinge 22 is also secured by any suitable means to the post 14. The other leaf 24 of the hinge 22 is secured to one end of the door 16 and, specifically, to a tubular reinforcing element 26. The door includes an outer sheet metal panel 28 to which is mounted a base for the holding assembly including vertically spaced, horizontally extending plates 30. The ends of the plates 30 adjacent the hinge 22 mount a vertically extending plate 32 provided with one or more cushions 34 for engagement with the sheet metal panel 18 at a location whereat it is reinforced by the vertically extending post 14.

At the opposite end of the plates 30, there is provided a further plate 36 which is provided with a split or slot (not shown) but to be explained in greater detail hereinafter.

Journalled between the plates is a crank shaft 40. The upper end of the crank shaft 40 mounts a handle 42, while intermediate the plates 30, the crank shaft 40 mounts an eccentric arm 44.

A pair of nonlinear links 46, which are preferably curved as illustrated in FIGS. 2 and 3, sandwich the eccentric 44 and are pivotally connected thereto by means of a pivot pin 48. The end of each of the links 46 opposite the pivot pin 48 is connected by a pivot pin 50 to a resilient link 52 formed of an elastomer. The link 52, at its end opposite the pivot 50, includes an enlarged bulbous formation 54 which is adapted to be received in a slot 56 in a securing bracket 58 secured to the panel 18 by any suitable means.

When it is desired to maintain the door 16 open with the stop cushions 34 in firm engagement with the sheet metal panel 18, the handle 42 is rotated clockwise from the position shown in FIG. 2 to a position whereat the links 46 assume the dotted line position shown in FIG. 2. At this time, the bulbous formation 54 may be moved behind the bracket 58 so that the main portion of the link 52 may extend through the slot but the link 52 will be retained by the bracket 58 by means of the enlarged bulbous formation engaging a side thereof. The handle 42 may then be rotated to the position illustrated in FIG. 2 with the consequence that the links 46 will move away from the bracket 58 thereby tensioning the resilient link 52. At some point in such movement, the links 46 will engage the crank shaft 40 to limit further rotation thereof. It will be observed that when such has occurred, the pivot 48 has moved over center with respect to the crank shaft 40. Thus, the tension in the link 52 will tend to retain the elements in the solid line position illustrated in FIG. 2 as well as hold the door 16 firmly against the panel 18. Consequently, there will be no rattling nor will there by any play in the connection that could lead to damage of the stops. At the same time, by suitably selecting the resilient link 52, the same can be formed so that unnecessarily large forces that would tend to damage the stops are avoided. Thus, gradual deterioration of the stops is avoided with the result that damaging contact between the door 16 and, for example, a window 62, if open, cannot occur to cause breakage of either.

FIG. 3 illustrates the inoperative configuration of the door holding assembly.

It will be recalled that plate 36 includes a horizontally extending slot or the like for receipt of the bulbous portion 54 of the link 52. After the bulbous portion 54 of the link 52 has been placed in the slot of the plate 36, the handle 42 may be moved to the position illustrated in a counterclockwise direction. At the position illustrated in FIG. 3, the radially outer surface of the links 46 will engage the panel 28 preventing further counterclockwise movement of the handle. It will be noted that since the pivot 50 lies to one side of a line extending between the pivot axis of the shaft 40 and the point of engagement of the bulbous portion 54 with the plate 36, the tension will cause the components to be urged against the panel 28, as illustrated, so that the same will not rattle or otherwise create noise when not in use.

From the foregoing, it will be appreciated that a door holding assembly made according to the invention is ideally suited for use in sheet metal cab structures and eliminates difficulties heretofore posed when operators of vehicles having such cab structures have operated the same with the doors held open by cables, ropes, or the like.

What is claimed is:

1. A device for selectively holding a door against a stop comprising:
   a crank having a handle and an eccentric;
   means mounting said crank for rotation and adapted to be secured to one of a door and wall mounting a door;
   means defining a resilient linkage having one end connected to said eccentric;
   securing means including two elements selectively interconnectable, one of said elements being on said link other end and the other being adapted to be secured to the other of a door and a wall; and
   means for limiting rotation of the crank on said mounting means to allow over center action in said linkage means whereby the resilience of said linkage means may firmly hold a door against a stop.

2. The device of claim 1 wherein said limiting means comprises a nonlinear link connecting said linkage means to said eccentric and adapted to engage said crank to limit rotation thereof.

3. In a sheet metal cab structure for a vehicle provided with a rollover protection structure including a vertical post and a door hingedly mounted for movement between open and closed positions about a vertical axis closely adjacent said post, a door holdback assembly comprising: a base mounted on said door and including a stop at one end positioned to engage said sheet metal cab at a location whereat the sheet metal is backed by said vertical post; a crank having a handle and an eccentric and journalled on said base; a resilient link connected to said eccentric; selectively operable securing means including an end of said link remote from said eccentric and a bracket secured to said cab side wall whereby said link may be selectively connected and disconnected from said sheet metal cab; and means for limiting rotation of said crank relative to said base to provide a resilient, over center action whereby the resilience of said link will cause said stop to firmly abut said sheet metal cab at said location.

4. The sheet metal cab of claim 3 wherein said limiting means comprises a nonlinear, rigid link interconnecting said resilient link and said eccentric and disposed about said crank for engagement therewith to limit said rotation thereof, said base further mounting a means for selectively receiving said end of said link, said nonlinear link further limiting rotation of said crank when said link end is disposed in said receiving means whereby said link and said crank will not rattle when not employed to hold a door open.

5. The sheet metal cab of claim 4 wherein there are two said nonlinear links, each of said nonlinear links being curved and being spaced about said eccentric and said resilient link.

6. The sheet metal cab of claim 4 wherein said resilient link is formed of an elastomer and said end comprises a bulbous formation thereon.

7. A door holdback structure for use in connection with doors of sheet metal cabs of vehicles or the like wherein the doors and the remainder of the sheet metal cabs are provided with reinforcing backing members, said holdback structure comprising:
   a base adapted to be secured to a door or a sheet metal wall of a cab of a vehicle;

stop means carried by said base adjacent one end thereof and positionable to engage the other of the door and the cab wall at a point backed by a reinforcing member;

a first securing element adapted to be affixed to the other of said door and said side wall;

a second securing element adapted to be selectively interconnected to said first securing element;

a crank having an eccentric journalled in said base;

means associated with said crank for selectively rotating the same;

a resilient link mounting said second securing element on one end thereof; and a rigid link pivotally secured to said resilient link at the other end thereof and to said crank and positioned to engage said crank and limit rotation thereof to provide an over center action whereby the resilience of the link may cause the stop means to firmly abut the one of the side wall and the door.

* * * * *